(12) United States Patent  (10) Patent No.: US 8,135,050 B1
Stadler et al.  (45) Date of Patent: Mar. 13, 2012

(54) AUTOMATED POLARIZATION CORRECTION

(75) Inventors: Andrew D. Stadler, San Francisco, CA (US); Michael Marshall Mielke, Orlando, FL (US); Laurent Vaissié, Oviedo, FL (US); Ismail Tolga Yilmaz, Orlando, FL (US); Thomas Saunders, Oviedo, FL (US)

(73) Assignee: Raydiance, Inc., Petaluma, CA (US)

( * ) Notice: Subject to any disclaimer, the term of this patent is extended or adjusted under 35 U.S.C. 154(b) by 43 days.

(21) Appl. No.: 11/489,792

(22) Filed: Jul. 19, 2006

Related U.S. Application Data

(60) Provisional application No. 60/700,429, filed on Jul. 19, 2005.

(51) Int. Cl.
*H01S 3/13* (2006.01)
(52) U.S. Cl. ........................................................ 372/31
(58) Field of Classification Search ............... 372/31
See application file for complete search history.

(56) References Cited

U.S. PATENT DOCUMENTS

| | | | |
|---|---|---|---|
| 2,436,662 A | 2/1948 | Norgaard | |
| 3,459,960 A | 8/1969 | Aaland et al. | |
| 3,549,256 A | 12/1970 | Brienza et al. | |
| 3,599,019 A | 8/1971 | Nannichi et al. | |
| 3,602,836 A | 8/1971 | Young | |
| 3,622,907 A | 11/1971 | Tomlinson et al. | |
| 3,626,318 A | 12/1971 | Young | |
| 3,628,179 A | 12/1971 | Cuff | |
| 3,631,362 A | 12/1971 | Almasi et al. | |
| 3,646,469 A | 2/1972 | Buczek et al. | |
| 3,654,624 A | 4/1972 | Becker et al. | |
| 3,696,308 A | 10/1972 | Duffy et al. | |
| 3,735,282 A | 5/1973 | Gans | |
| 3,806,829 A | 4/1974 | Duston et al. | |
| 3,808,549 A | 4/1974 | Maurer | |
| 3,851,267 A | 11/1974 | Tanner | |
| 3,942,127 A | 3/1976 | Fluhr et al. | |
| 3,963,953 A | 6/1976 | Thornton, Jr. | |
| 4,061,427 A | 12/1977 | Fletcher et al. | |
| 4,194,813 A | 3/1980 | Benjamin et al. | |
| 4,289,378 A | 9/1981 | Remy et al. | |
| 4,389,617 A | 6/1983 | Kurnit | |

(Continued)

FOREIGN PATENT DOCUMENTS

EP 214100 A 3/1987

(Continued)

OTHER PUBLICATIONS

Stock et al., "Chirped Pulse Amplification in an Erbium-doped Diber Oscillator/Erbium-doped Fiber Amplifier System", Optics Communication, North-Holland Publishing Co., Amsterdam, NL, vol. 106, No. Apr. 5, 2006, pp. 249-252, XP000429901, Issn: 0030-4018.

(Continued)

*Primary Examiner* — Jessica Stultz
*Assistant Examiner* — Patrick Stafford
(74) *Attorney, Agent, or Firm* — Carr & Ferrell LLP

(57) ABSTRACT

A chirped pulse amplification system includes one or more polarization compensator configured to compensate for polarization altering elements with the chirped pulse amplification system. The polarization compensator is responsive to a sensor configured to provide feedback to the polarization compensator. In some embodiments, the chirped pulse amplification system further includes a controller configured to automatically adjust the polarization compensator responsive to the sensor. The sensor is optionally a power sensor.

22 Claims, 5 Drawing Sheets

U.S. PATENT DOCUMENTS

| | | |
|---|---|---|
| 4,394,623 A | 7/1983 | Kurnit |
| 4,590,598 A | 5/1986 | O'Harra, II |
| 4,622,095 A | 11/1986 | Grobman et al. |
| 4,655,547 A | 4/1987 | Heritage et al. |
| 4,673,795 A | 6/1987 | Ortiz, Jr. |
| 4,718,418 A | 1/1988 | L'Esperance, Jr. |
| 4,722,591 A | 2/1988 | Haffner |
| 4,730,113 A | 3/1988 | Edwards et al. |
| 4,750,809 A | 6/1988 | Kafka et al. |
| 4,808,000 A | 2/1989 | Pasciak |
| 4,815,079 A | 3/1989 | Snitzer et al. |
| 4,824,598 A | 4/1989 | Stokowski |
| 4,827,125 A | 5/1989 | Goldstein |
| 4,829,529 A | 5/1989 | Kafka |
| 4,835,670 A | 5/1989 | Adams et al. |
| 4,847,846 A | 7/1989 | Sone et al. |
| 4,848,340 A | 7/1989 | Bille et al. |
| 4,849,036 A | 7/1989 | Powell et al. |
| 4,856,011 A | 8/1989 | Shimada et al. |
| 4,902,127 A | 2/1990 | Byer et al. |
| 4,907,586 A | 3/1990 | Bille et al. |
| 4,913,520 A | 4/1990 | Kafka |
| 4,915,757 A | 4/1990 | Rando |
| 4,928,316 A | 5/1990 | Heritage et al. |
| 4,947,398 A | 8/1990 | Yasuda et al. |
| 4,950,268 A | 8/1990 | Rink |
| 4,972,423 A | 11/1990 | Alfano et al. |
| 4,983,034 A * | 1/1991 | Spillman, Jr. ................ 356/32 |
| 4,988,348 A | 1/1991 | Bille |
| 4,994,059 A | 2/1991 | Kosa et al. |
| 5,010,555 A | 4/1991 | Madey et al. |
| 5,014,290 A | 5/1991 | Moore et al. |
| 5,022,042 A | 6/1991 | Bradley |
| 5,031,236 A | 7/1991 | Hodgkinson et al. |
| 5,043,991 A | 8/1991 | Bradley |
| 5,053,171 A | 10/1991 | Portney et al. |
| 5,095,487 A | 3/1992 | Meyerhofer et al. |
| 5,098,426 A | 3/1992 | Sklar et al. |
| 5,122,439 A | 6/1992 | Miersch et al. |
| 5,132,996 A | 7/1992 | Moore et al. |
| 5,146,088 A | 9/1992 | Kingham et al. |
| 5,154,707 A | 10/1992 | Rink et al. |
| 5,159,402 A | 10/1992 | Ortiz, Jr. |
| 5,162,643 A | 11/1992 | Currie |
| 5,166,818 A | 11/1992 | Chase et al. |
| 5,187,759 A | 2/1993 | DiGiovanni et al. |
| 5,204,867 A | 4/1993 | Koschmann |
| 5,206,455 A | 4/1993 | Williams et al. |
| 5,217,003 A | 6/1993 | Wilk |
| 5,233,182 A | 8/1993 | Szabo et al. |
| 5,237,576 A | 8/1993 | DiGiovanni et al. |
| 5,255,117 A | 10/1993 | Cushman |
| 5,257,273 A | 10/1993 | Farries et al. |
| 5,265,107 A | 11/1993 | Delfyett, Jr. |
| 5,267,077 A | 11/1993 | Blonder |
| 5,278,853 A | 1/1994 | Shirai et al. |
| 5,291,501 A | 3/1994 | Hanna |
| 5,293,186 A | 3/1994 | Seden et al. |
| 5,301,347 A | 4/1994 | Kensky |
| 5,302,835 A | 4/1994 | Bendett et al. |
| 5,309,453 A | 5/1994 | Treacy |
| 5,313,262 A | 5/1994 | Leonard |
| 5,315,431 A | 5/1994 | Masuda et al. |
| 5,315,436 A | 5/1994 | Lowenhar et al. |
| 5,329,398 A | 7/1994 | Lai et al. |
| 5,331,131 A | 7/1994 | Opdyke |
| 5,355,383 A | 10/1994 | Lockard |
| 5,367,143 A | 11/1994 | White, Jr. |
| 5,400,350 A | 3/1995 | Galvanauskas |
| 5,409,376 A | 4/1995 | Murphy |
| 5,411,918 A | 5/1995 | Keible et al. |
| 5,414,725 A | 5/1995 | Fermann et al. |
| 5,418,809 A | 5/1995 | August, Jr. et al. |
| 5,428,471 A | 6/1995 | McDermott |
| 5,430,572 A | 7/1995 | DiGiovanni et al. |
| 5,440,573 A | 8/1995 | Fermann |
| 5,446,813 A | 8/1995 | Lee et al. |
| 5,450,427 A | 9/1995 | Fermann et al. |
| 5,479,422 A | 12/1995 | Fermann et al. |
| 5,489,984 A | 2/1996 | Hariharan et al. |
| 5,493,579 A | 2/1996 | Ressl et al. |
| 5,499,134 A | 3/1996 | Galvanauskas et al. |
| 5,517,043 A | 5/1996 | Ma et al. |
| 5,520,679 A | 5/1996 | Lin |
| 5,548,098 A | 8/1996 | Sugawara et al. |
| 5,572,335 A | 11/1996 | Stevens |
| 5,572,358 A | 11/1996 | Gabl et al. |
| 5,585,642 A | 12/1996 | Britton et al. |
| 5,585,652 A | 12/1996 | Kamasz et al. |
| 5,585,913 A | 12/1996 | Hariharan et al. |
| 5,590,142 A | 12/1996 | Shan |
| 5,592,327 A | 1/1997 | Gabl et al. |
| 5,596,668 A | 1/1997 | DiGiovanni et al. |
| 5,602,673 A | 2/1997 | Swan |
| 5,602,677 A | 2/1997 | Tournois |
| 5,615,043 A | 3/1997 | Plaessmann et al. |
| 5,617,434 A | 4/1997 | Tamura et al. |
| 5,624,587 A | 4/1997 | Otsuki et al. |
| 5,625,544 A | 4/1997 | Kowshik et al. |
| 5,627,848 A | 5/1997 | Fermann et al. |
| 5,631,771 A | 5/1997 | Swan |
| 5,633,750 A | 5/1997 | Nogiwa et al. |
| 5,633,885 A | 5/1997 | Galvanauskas et al. |
| 5,642,447 A | 6/1997 | Pan et al. |
| 5,644,424 A | 7/1997 | Backus et al. |
| 5,651,018 A | 7/1997 | Mehuys et al. |
| 5,656,186 A | 8/1997 | Mourou et al. |
| 5,657,153 A | 8/1997 | Endriz et al. |
| 5,661,829 A | 8/1997 | Zheng |
| 5,663,731 A | 9/1997 | Theodoras, II et al. |
| 5,665,942 A | 9/1997 | Williams et al. |
| 5,666,722 A | 9/1997 | Tamm et al. |
| 5,670,067 A | 9/1997 | Koide et al. |
| 5,677,769 A | 10/1997 | Bendett |
| 5,689,361 A | 11/1997 | Damen et al. |
| 5,689,519 A | 11/1997 | Fermann et al. |
| 5,694,501 A | 12/1997 | Alavie et al. |
| 5,696,782 A | 12/1997 | Harter et al. |
| 5,701,319 A | 12/1997 | Fermann |
| 5,703,639 A | 12/1997 | Farrier et al. |
| 5,708,669 A | 1/1998 | DiGiovanni et al. |
| 5,710,424 A | 1/1998 | Theodoras, II et al. |
| 5,720,894 A | 2/1998 | Neev et al. |
| 5,726,855 A | 3/1998 | Mourou et al. |
| 5,734,762 A | 3/1998 | Ho et al. |
| 5,736,709 A | 4/1998 | Neiheisel |
| 5,739,933 A | 4/1998 | Dembeck et al. |
| 5,770,864 A | 6/1998 | Dlugos |
| 5,771,253 A | 6/1998 | Chang-Hasnain et al. |
| 5,778,016 A | 7/1998 | Sucha et al. |
| 5,781,289 A | 7/1998 | Sabsabi et al. |
| 5,788,688 A | 8/1998 | Bauer et al. |
| 5,790,574 A | 8/1998 | Rieger et al. |
| 5,815,519 A | 9/1998 | Aoshima et al. |
| 5,818,630 A | 10/1998 | Fermann et al. |
| 5,822,097 A | 10/1998 | Tournois |
| 5,844,149 A | 12/1998 | Akiyoshi et al. |
| 5,847,825 A | 12/1998 | Alexander |
| 5,847,863 A | 12/1998 | Galvanauskas et al. |
| 5,862,287 A | 1/1999 | Stock et al. |
| 5,862,845 A | 1/1999 | Chin et al. |
| 5,867,304 A | 2/1999 | Galvanauskas et al. |
| 5,875,408 A | 2/1999 | Bendett et al. |
| 5,880,823 A | 3/1999 | Lu |
| 5,880,877 A | 3/1999 | Fermann et al. |
| 5,898,485 A | 4/1999 | Nati, Jr. |
| 5,907,157 A | 5/1999 | Yoshioka et al. |
| 5,920,668 A | 7/1999 | Uehara et al. |
| 5,923,686 A | 7/1999 | Fermann et al. |
| 5,929,430 A | 7/1999 | Yao et al. |
| 5,936,716 A | 8/1999 | Pinsukanjana et al. |
| 5,999,847 A | 12/1999 | Elstrom |
| 6,014,249 A | 1/2000 | Fermann et al. |
| 6,016,452 A | 1/2000 | Kasevich |
| 6,020,591 A | 2/2000 | Harter et al. |
| 6,034,975 A | 3/2000 | Harter et al. |
| 6,041,020 A | 3/2000 | Caron et al. |

| | | | | | | |
|---|---|---|---|---|---|---|
| 6,061,373 | A | 5/2000 | Brockman et al. | 6,555,781 B2 | 4/2003 | Ngoi et al. |
| 6,071,276 | A | 6/2000 | Abela | 6,556,733 B2 | 4/2003 | Dy et al. |
| 6,072,811 | A | 6/2000 | Fermann et al. | 6,567,431 B2 | 5/2003 | Tabirian et al. |
| 6,075,588 | A | 6/2000 | Pinsukanjana et al. | 6,570,704 B2 | 5/2003 | Palese |
| 6,081,369 | A | 6/2000 | Waarts et al. | 6,573,813 B1 | 6/2003 | Joannopoulos et al. |
| 6,088,153 | A | 7/2000 | Anthon et al. | 6,574,024 B1 | 6/2003 | Liu |
| 6,099,522 | A | 8/2000 | Knopp et al. | 6,574,250 B2 | 6/2003 | Sun et al. |
| 6,120,857 | A | 9/2000 | Balooch et al. | 6,576,917 B1 | 6/2003 | Silfvast |
| 6,122,097 | A | 9/2000 | Weston et al. | 6,580,553 B2 | 6/2003 | Kim et al. |
| 6,130,780 | A | 10/2000 | Joannopoulos et al. | 6,587,488 B1 | 7/2003 | Meissner et al. |
| 6,134,003 | A | 10/2000 | Tearney et al. | 6,597,497 B2 | 7/2003 | Wang et al. |
| 6,141,140 | A | 10/2000 | Kim | 6,603,903 B1 | 8/2003 | Tong et al. |
| 6,151,338 | A | 11/2000 | Grubb et al. | 6,603,911 B2 | 8/2003 | Fink et al. |
| 6,154,310 | A | 11/2000 | Galvanauskas et al. | 6,621,040 B1 | 9/2003 | Perry et al. |
| 6,156,030 | A | 12/2000 | Neev | 6,621,045 B1 | 9/2003 | Liu et al. |
| 6,161,543 | A | 12/2000 | Cox et al. | 6,627,421 B1 | 9/2003 | Unger et al. |
| 6,168,590 | B1 | 1/2001 | Neev | 6,627,844 B2 | 9/2003 | Liu et al. |
| 6,172,611 | B1 | 1/2001 | Hussain et al. | 6,642,477 B1 | 11/2003 | Patel et al. |
| 6,175,437 | B1 | 1/2001 | Diels et al. | 6,647,031 B2 | 11/2003 | Delfyett et al. |
| 6,179,421 | B1 | 1/2001 | Pang | 6,654,161 B2 | 11/2003 | Bass et al. |
| 6,181,463 | B1 | 1/2001 | Galvanauskas et al. | 6,661,816 B2 | 12/2003 | Delfyett et al. |
| 6,190,380 | B1 | 2/2001 | Abela | 6,661,820 B1 | 12/2003 | Camilleri et al. |
| 6,198,568 | B1 | 3/2001 | Galvanauskas et al. | 6,671,298 B1 | 12/2003 | Delfyett et al. |
| 6,198,766 | B1 | 3/2001 | Schuppe et al. | 6,677,552 B1 | 1/2004 | Tulloch et al. |
| 6,201,914 | B1 | 3/2001 | Duguay et al. | 6,681,079 B1 | 1/2004 | Maroney |
| 6,208,458 | B1 | 3/2001 | Galvanauskas et al. | 6,690,686 B2 | 2/2004 | Delfyett |
| 6,246,816 | B1 | 6/2001 | Moore et al. | 6,695,835 B2 | 2/2004 | Furuno et al. |
| 6,249,630 | B1 | 6/2001 | Stock et al. | 6,696,008 B2 | 2/2004 | Brandinger |
| 6,252,892 | B1 | 6/2001 | Jiang et al. | 6,697,402 B2 | 2/2004 | Crawford |
| 6,256,328 | B1 | 7/2001 | Delfyett et al. | 6,697,408 B2 | 2/2004 | Kennedy et al. |
| 6,269,108 | B1 | 7/2001 | Tabirian et al. | 6,700,094 B1 | 3/2004 | Kuntze |
| 6,271,650 | B1 | 8/2001 | Massie et al. | 6,700,698 B1 | 3/2004 | Scott |
| 6,275,250 | B1 | 8/2001 | Sanders et al. | 6,706,036 B2 | 3/2004 | Lai |
| 6,275,512 | B1 | 8/2001 | Fermann | 6,706,998 B2 | 3/2004 | Cutler |
| 6,281,471 | B1 | 8/2001 | Smart | 6,710,288 B2 | 3/2004 | Liu et al. |
| 6,290,910 | B1 | 9/2001 | Chalk | 6,710,293 B2 | 3/2004 | Liu et al. |
| 6,303,903 | B1 | 10/2001 | Liu | 6,711,334 B2 | 3/2004 | Szkopek et al. |
| 6,314,115 | B1 | 11/2001 | Delfyett et al. | 6,716,475 B1 | 4/2004 | Fink et al. |
| 6,325,792 | B1 | 12/2001 | Swinger et al. | 6,720,519 B2 | 4/2004 | Liu et al. |
| 6,327,074 | B1 | 12/2001 | Bass et al. | 6,723,991 B1 | 4/2004 | Sucha et al. |
| 6,327,282 | B2 | 12/2001 | Hammons et al. | 6,727,458 B2 | 4/2004 | Smart |
| 6,330,383 | B1 | 12/2001 | Cai et al. | 6,728,273 B2 | 4/2004 | Perry |
| 6,334,011 | B1 | 12/2001 | Galvanauskas et al. | 6,728,439 B2 | 4/2004 | Weisberg et al. |
| 6,335,821 | B1 | 1/2002 | Suzuki et al. | 6,735,229 B1 | 5/2004 | Delfyett et al. |
| 6,340,806 | B1 | 1/2002 | Smart et al. | 6,735,368 B2 | 5/2004 | Parker et al. |
| RE037,585 | E | 3/2002 | Mourou et al. | 6,738,144 B1 | 5/2004 | Dogariu |
| 6,355,908 | B1 | 3/2002 | Tatah et al. | 6,738,408 B2 | 5/2004 | Abedin |
| 6,359,681 | B1 | 3/2002 | Housand et al. | 6,744,555 B2 | 6/2004 | Galvanauskas et al. |
| 6,362,454 | B1 | 3/2002 | Liu | 6,747,795 B2 | 6/2004 | Lin et al. |
| 6,365,869 | B1 | 4/2002 | Swain et al. | 6,749,285 B2 | 6/2004 | Liu et al. |
| 6,366,395 | B1 | 4/2002 | Drake et al. | 6,760,356 B2 | 7/2004 | Erbert et al. |
| 6,370,171 | B1 | 4/2002 | Horn et al. | 6,774,869 B2 | 8/2004 | Biocca et al. |
| 6,370,422 | B1 | 4/2002 | Richards-Kortum et al. | 6,782,207 B1 | 8/2004 | Efimov |
| 6,396,317 | B1 | 5/2002 | Roller et al. | 6,785,303 B1 | 8/2004 | Holzwarth et al. |
| 6,400,871 | B1 | 6/2002 | Minden | 6,785,445 B2 | 8/2004 | Kuroda et al. |
| 6,404,944 | B1 | 6/2002 | Wa et al. | 6,787,733 B2 | 9/2004 | Lubatschowski et al. |
| 6,407,363 | B2 | 6/2002 | Dunsky et al. | 6,787,734 B2 | 9/2004 | Liu |
| 6,418,154 | B1 | 7/2002 | Kneip et al. | 6,788,864 B2 | 9/2004 | Ahmad et al. |
| 6,418,256 | B1 | 7/2002 | Danziger et al. | 6,791,060 B2 | 9/2004 | Dunsky et al. |
| 6,421,169 | B1 | 7/2002 | Bonnedal et al. | 6,791,071 B2 | 9/2004 | Woo et al. |
| 6,433,303 | B1 | 8/2002 | Liu et al. | 6,795,461 B1 | 9/2004 | Blair et al. |
| 6,433,305 | B1 | 8/2002 | Liu et al. | 6,801,550 B1 | 10/2004 | Snell et al. |
| 6,433,760 | B1 | 8/2002 | Vaissie et al. | 6,801,551 B1 | 10/2004 | Delfyett et al. |
| 6,463,314 | B1 | 10/2002 | Haruna | 6,801,557 B2 | 10/2004 | Liu |
| 6,482,199 | B1 | 11/2002 | Neev | 6,803,539 B2 | 10/2004 | Liu et al. |
| 6,485,413 | B1 | 11/2002 | Boppart et al. | 6,804,574 B2 | 10/2004 | Cheng et al. |
| 6,486,435 | B1 | 11/2002 | Beyer et al. | 6,807,353 B1 | 10/2004 | Fleming et al. |
| 6,496,099 | B2 | 12/2002 | Wang et al. | 6,807,375 B2 | 10/2004 | Dogariu |
| 6,501,590 | B2 | 12/2002 | Bass et al. | 6,815,638 B2 | 11/2004 | Liu |
| 6,522,460 | B2 | 2/2003 | Bonnedal et al. | 6,819,694 B2 | 11/2004 | Jiang et al. |
| 6,522,674 | B1 | 2/2003 | Niwano et al. | 6,819,702 B2 | 11/2004 | Sverdlov et al. |
| 6,525,873 | B2 | 2/2003 | Gerrish et al. | 6,819,837 B2 | 11/2004 | Li et al. |
| 6,526,085 | B2 | 2/2003 | Vogler et al. | 6,822,251 B1 | 11/2004 | Arenberg et al. |
| 6,526,327 | B2 | 2/2003 | Kar et al. | 6,824,540 B1 | 11/2004 | Lin |
| 6,529,319 | B2 | 3/2003 | Youn et al. | 6,829,517 B2 | 12/2004 | Cheng et al. |
| 6,541,731 | B2 | 4/2003 | Mead et al. | 6,834,134 B2 | 12/2004 | Brennan, III et al. |
| 6,547,453 | B1 | 4/2003 | Stummer et al. | 6,836,703 B2 | 12/2004 | Wang et al. |
| 6,549,547 | B2 | 4/2003 | Galvanauskas et al. | 6,878,900 B2 | 4/2005 | Corkum et al. |
| 6,552,301 | B2 | 4/2003 | Herman et al. | 6,882,772 B1 | 4/2005 | Lowery et al. |

| Patent/Pub No. | Date | Inventors |
|---|---|---|
| 6,885,683 B1 | 4/2005 | Fermann et al. |
| 6,887,804 B2 | 5/2005 | Sun et al. |
| 6,897,405 B2 | 5/2005 | Cheng et al. |
| 6,902,561 B2 | 6/2005 | Kurtz et al. |
| 6,917,631 B2 | 7/2005 | Richardson et al. |
| 6,928,490 B1 | 8/2005 | Bucholz et al. |
| 6,937,629 B2 | 8/2005 | Perry et al. |
| 6,943,359 B2 | 9/2005 | Vardeny et al. |
| 6,956,680 B2 | 10/2005 | Morbieu et al. |
| 6,994,703 B2 | 2/2006 | Wang et al. |
| 7,002,733 B2 | 2/2006 | Dagenais et al. |
| 7,006,730 B2 | 2/2006 | Doerr |
| 7,022,119 B2 | 4/2006 | Hohla |
| 7,031,571 B2 | 4/2006 | Mihailov et al. |
| 7,068,408 B2 | 6/2006 | Sakai |
| 7,072,101 B2 | 7/2006 | Kapteyn et al. |
| 7,088,756 B2 | 8/2006 | Fermann et al. |
| 7,095,772 B1 | 8/2006 | Delfyett et al. |
| 7,097,640 B2 | 8/2006 | Wang et al. |
| 7,099,549 B2 | 8/2006 | Scheuer et al. |
| 7,116,688 B2 | 10/2006 | Sauter et al. |
| 7,132,289 B2 | 11/2006 | Kobayashi et al. |
| 7,143,769 B2 | 12/2006 | Stoltz et al. |
| 7,171,074 B2 | 1/2007 | DiGiovanni et al. |
| 7,217,266 B2 | 5/2007 | Anderson et al. |
| 7,220,255 B2 | 5/2007 | Lai |
| 7,233,607 B2 | 6/2007 | Richardson et al. |
| 7,257,302 B2 | 8/2007 | Fermann et al. |
| 7,289,707 B1 | 10/2007 | Chavez-Pirson et al. |
| 7,321,605 B2 | 1/2008 | Albert |
| 7,321,713 B2 | 1/2008 | Akiyama et al. |
| 7,332,234 B2 | 2/2008 | Levinson et al. |
| 7,349,452 B2 | 3/2008 | Brennan, III et al. |
| 7,361,171 B2 | 4/2008 | Stoltz et al. |
| 7,367,969 B2 | 5/2008 | Stoltz et al. |
| 7,413,565 B2 | 8/2008 | Wang et al. |
| 7,444,049 B1 | 10/2008 | Kim et al. |
| 7,505,196 B2 | 3/2009 | Nati et al. |
| 7,518,788 B2 | 4/2009 | Fermann et al. |
| 7,584,756 B2 | 9/2009 | Zadoyan et al. |
| 7,728,967 B2 | 6/2010 | Ochiai et al. |
| 7,773,294 B2 | 8/2010 | Brunet et al. |
| 7,787,175 B1 | 8/2010 | Brennan, III et al. |
| 7,822,347 B1 | 10/2010 | Brennan, III et al. |
| 7,963,958 B2 | 6/2011 | Stoltz et al. |
| 2001/0009250 A1 | 7/2001 | Herman et al. |
| 2001/0021294 A1 | 9/2001 | Cai et al. |
| 2001/0046243 A1 | 11/2001 | Schie |
| 2002/0003130 A1 | 1/2002 | Sun et al. |
| 2002/0051606 A1 | 5/2002 | Takushima et al. |
| 2002/0071454 A1 | 6/2002 | Lin |
| 2002/0091325 A1 | 7/2002 | Ostrovsky |
| 2002/0095142 A1 | 7/2002 | Ming |
| 2002/0097468 A1 | 7/2002 | Mecherle et al. |
| 2002/0097761 A1 | 7/2002 | Sucha et al. |
| 2002/0118934 A1 | 8/2002 | Danziger et al. |
| 2002/0153500 A1 | 10/2002 | Fordahl et al. |
| 2002/0167581 A1 | 11/2002 | Cordingley et al. |
| 2002/0167974 A1 | 11/2002 | Kennedy et al. |
| 2002/0176676 A1 | 11/2002 | Johnson et al. |
| 2002/0186915 A1 | 12/2002 | Yu et al. |
| 2002/0191901 A1 | 12/2002 | Jensen |
| 2003/0011782 A1 | 1/2003 | Tanno |
| 2003/0031410 A1 | 2/2003 | Schnitzer |
| 2003/0039442 A1 | 2/2003 | Bond et al. |
| 2003/0053508 A1 | 3/2003 | Dane et al. |
| 2003/0055413 A1 | 3/2003 | Altshuler et al. |
| 2003/0060808 A1 | 3/2003 | Wilk |
| 2003/0086647 A1 | 5/2003 | Willner et al. |
| 2003/0095266 A1 | 5/2003 | Detalle et al. |
| 2003/0123496 A1 | 7/2003 | Broutin et al. |
| 2003/0142705 A1* | 7/2003 | Hackel et al. .................. 372/22 |
| 2003/0156605 A1* | 8/2003 | Richardson et al. ............ 372/25 |
| 2003/0161365 A1 | 8/2003 | Perry et al. |
| 2003/0161378 A1 | 8/2003 | Zhang et al. |
| 2003/0178396 A1 | 9/2003 | Naumov et al. |
| 2003/0202547 A1 | 10/2003 | Fermann et al. |
| 2003/0205561 A1 | 11/2003 | Iso |
| 2003/0214714 A1 | 11/2003 | Zheng |
| 2003/0223689 A1 | 12/2003 | Koch et al. |
| 2003/0235381 A1 | 12/2003 | Hunt |
| 2004/0000942 A1 | 1/2004 | Kapteyn et al. |
| 2004/0037505 A1 | 2/2004 | Morin |
| 2004/0042061 A1 | 3/2004 | Islam et al. |
| 2004/0049552 A1 | 3/2004 | Motoyama et al. |
| 2004/0101001 A1 | 5/2004 | Bergmann et al. |
| 2004/0128081 A1 | 7/2004 | Rabitz et al. |
| 2004/0134894 A1 | 7/2004 | Gu et al. |
| 2004/0134896 A1 | 7/2004 | Gu et al. |
| 2004/0160995 A1 | 8/2004 | Sauter et al. |
| 2004/0226925 A1 | 11/2004 | Gu et al. |
| 2004/0231682 A1 | 11/2004 | Stoltz et al. |
| 2004/0233944 A1 | 11/2004 | Dantus et al. |
| 2004/0263950 A1 | 12/2004 | Fermann et al. |
| 2005/0008044 A1 | 1/2005 | Fermann et al. |
| 2005/0018986 A1* | 1/2005 | Argyros et al. ................ 385/125 |
| 2005/0035097 A1 | 2/2005 | Stoltz |
| 2005/0036527 A1 | 2/2005 | Khazaei et al. |
| 2005/0038487 A1 | 2/2005 | Stoltz |
| 2005/0061779 A1 | 3/2005 | Blumenfeld et al. |
| 2005/0065502 A1 | 3/2005 | Stoltz |
| 2005/0067388 A1 | 3/2005 | Sun et al. |
| 2005/0074974 A1 | 4/2005 | Stoltz |
| 2005/0077275 A1 | 4/2005 | Stoltz |
| 2005/0105865 A1 | 5/2005 | Fermann et al. |
| 2005/0107773 A1 | 5/2005 | Bergt et al. |
| 2005/0111073 A1 | 5/2005 | Pan et al. |
| 2005/0111500 A1 | 5/2005 | Harter et al. |
| 2005/0127049 A1 | 6/2005 | Woeste et al. |
| 2005/0154380 A1 | 7/2005 | DeBenedictis et al. |
| 2005/0163426 A1 | 7/2005 | Fermann et al. |
| 2005/0167405 A1 | 8/2005 | Stoltz et al. |
| 2005/0171516 A1 | 8/2005 | Stoltz et al. |
| 2005/0171518 A1 | 8/2005 | Stoltz et al. |
| 2005/0175280 A1 | 8/2005 | Nicholson |
| 2005/0177143 A1 | 8/2005 | Bullington et al. |
| 2005/0195726 A1 | 9/2005 | Bullington et al. |
| 2005/0213630 A1 | 9/2005 | Mielke et al. |
| 2005/0215985 A1 | 9/2005 | Mielke et al. |
| 2005/0218122 A1 | 10/2005 | Yamamoto et al. |
| 2005/0225846 A1 | 10/2005 | Nati et al. |
| 2005/0226286 A1 | 10/2005 | Liu et al. |
| 2005/0226287 A1 | 10/2005 | Shah et al. |
| 2005/0232560 A1 | 10/2005 | Knight et al. |
| 2005/0238070 A1 | 10/2005 | Imeshev et al. |
| 2005/0253482 A1 | 11/2005 | Kapps et al. |
| 2005/0259944 A1 | 11/2005 | Anderson et al. |
| 2005/0265407 A1 | 12/2005 | Braun et al. |
| 2005/0271094 A1 | 12/2005 | Miller et al. |
| 2005/0271340 A1 | 12/2005 | Weisberg et al. |
| 2006/0016891 A1 | 1/2006 | Giebel et al. |
| 2006/0030951 A1 | 2/2006 | Davlin et al. |
| 2006/0050750 A1 | 3/2006 | Barty |
| 2006/0056480 A1 | 3/2006 | Mielke et al. |
| 2006/0064079 A1 | 3/2006 | Stoltz et al. |
| 2006/0067604 A1 | 3/2006 | Bull et al. |
| 2006/0084957 A1 | 4/2006 | Delfyett et al. |
| 2006/0093012 A1 | 5/2006 | Singh et al. |
| 2006/0093265 A1 | 5/2006 | Jia et al. |
| 2006/0120418 A1 | 6/2006 | Harter et al. |
| 2006/0126679 A1 | 6/2006 | Brennan et al. |
| 2006/0131288 A1 | 6/2006 | Sun et al. |
| 2006/0187974 A1 | 8/2006 | Dantus |
| 2006/0209908 A1 | 9/2006 | Pedersen et al. |
| 2006/0210275 A1 | 9/2006 | Vaissie et al. |
| 2006/0221449 A1 | 10/2006 | Glebov et al. |
| 2006/0250025 A1 | 11/2006 | Kitagawa et al. |
| 2006/0268949 A1 | 11/2006 | Gohle et al. |
| 2007/0025728 A1 | 2/2007 | Nakazawa et al. |
| 2007/0047965 A1 | 3/2007 | Liu et al. |
| 2007/0064304 A1 | 3/2007 | Brennan III |
| 2007/0098025 A1 | 5/2007 | Hong et al. |
| 2007/0106416 A1 | 5/2007 | Griffiths et al. |
| 2007/0121686 A1 | 5/2007 | Vaissie et al. |
| 2007/0196048 A1 | 8/2007 | Galvanauskas et al. |
| 2007/0229939 A1 | 10/2007 | Brown et al. |
| 2007/0253455 A1 | 11/2007 | Stadler et al. |
| 2007/0273960 A1 | 11/2007 | Fermann et al. |

| | | | |
|---|---|---|---|
| 2008/0232407 A1 | 9/2008 | Harter et al. | |
| 2008/0240184 A1 | 10/2008 | Cho et al. | |
| 2009/0219610 A1 | 9/2009 | Mourou et al. | |
| 2009/0244695 A1 | 10/2009 | Marcinkevicius et al. | |
| 2009/0245302 A1 | 10/2009 | Baird et al. | |
| 2009/0257464 A1 | 10/2009 | Dantus et al. | |
| 2009/0273828 A1 | 11/2009 | Waarts et al. | |
| 2009/0297155 A1 | 12/2009 | Weiner et al. | |
| 2010/0040095 A1 | 2/2010 | Mielke et al. | |
| 2010/0118899 A1 | 5/2010 | Peng et al. | |
| 2010/0142034 A1 | 6/2010 | Wise et al. | |

FOREIGN PATENT DOCUMENTS

| | | |
|---|---|---|
| EP | 691563 A2 | 1/1996 |
| EP | 1462831 A1 | 9/2004 |
| JP | 8171103 | 7/1996 |
| JP | 11189472 A | 7/1999 |
| JP | 2003181661 A | 7/2003 |
| JP | 2003344883 | 12/2003 |
| JP | 2005174993 | 6/2005 |
| WO | W09428972 A1 | 12/1994 |
| WO | WO2004105100 A2 | 12/2004 |
| WO | WO2004114473 A2 | 12/2004 |
| WO | WO2005018060 A2 | 2/2005 |
| WO | WO2005018061 A2 | 2/2005 |
| WO | WO2005018062 A2 | 2/2005 |
| WO | WO2005018063 A2 | 2/2005 |
| WO | WO2007034317 A2 | 3/2007 |

OTHER PUBLICATIONS

Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018 (retrieved on Dec. 11, 1985.

Temelkuran, B. et al., "Wavelength-scalable Hollow Optical Fibres with Large Photonic Bandgaps for CO2 Laser Transmission," Nature, Dec. 12, 2002, pp. 650-653.

Thurston, R. N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.

Weiner, A.M. et al., "Synthesis of Phase-coherent, Picosecond Optical Square Pulses," Optics Letters, vol. 11, No. 3, pp. 153-155, Mar. 1986.

Weiner, A.M., "Femtosecond Optical Pulse Shaping and Processing," Prog. Quant. Electr. 1995, vol. 19, pp. 161-237, 1995.

Weiner, A.M., "High-resolution femtosecond Pulse Shaping," Journal of the Optical Society of America B. vol. 5, No. 8, pp. 1563-1572, Aug. 1988.

Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).

White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.

Yamakawa et al., "1 Hz, 1 ps, terawatt Nd: glass laser", Optics Communications, North-Holland Publishing Co. Amsterdam, Nl, vol. 112, No. 1-2, Nov. 1, 1994, pp. 37-42, XP024424285.

Yan et al., Ultrashort Pulse Measurement Using Interferometric Autocorrelator Based on Two-photon-absorbtion Detector at 1.55pm Wavelength Region., 2005, Proceedings of SPIE vol. 5633, Advanced Materials and Devices for Sensing and Imaging II, pp. 424-429.

Yeh, et al. "Theory of Bragg Fiber", Journal of the Optical Society America, Sep. 1978, pp. 1196, vol. 68, No. 9., pp. 1196-1201.

Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.

Yi, Y., et al., "On-chip Si-based Bragg Cladding Waveguide with High Index Contrast Bilayers", Optics Express, vol. 12, No. 20, Oct. 4, 2004, pp. 4775-4780.

Yin, D. et al., "Integrated Arrow Waveguides with Hollow Cores", Optics Express, vol. 12, No. 12, Jun. 14, 2004, pp. 2710-2715.

Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.

Agostinelli, J. et al., "Optical Pulse Shaping with a Grating Pair," Applied Optics, vol. 18, No. 14, pp. 2500-2504, Jul. 15, 1979.

Anastassiou et al., "Photonic Bandgap Fibers Exploiting Omnidirectional Reflectivity Enable Flexible Delivery of Infrared Lasers for Tissue Cutting," Proceedings of the SPIE—the International Society for Optical Engineering, SPIE, US, vol. 5317, No. 1, Jan. 1, 2004, pp. 29-38, XP002425586 ISSN: 0277-786X.

Benoit, G. et al., "Dynamic All-optical Tuning of Transverse Resonant Cavity Modes in Photonic Bandgap Fibers, "Optics Letters, vol. 30, No. 13, Jul. 1, 2005, pp. 1620-1622.

Chen, L. et al., "Ultrashort Optical Pulse Interaction with Fibre Gratings and Device Applications," 1997, Canaga, located at http://www.collectionscanada.ca/obj/s4/f2/dsk2/ftp04/mq29402.pfd.

Chen, X. et al., "Highly Birefringent Hollow-core Photonic Bandgap Fiber," Optics Express, vol. 12, No. 16, Aug. 9, 2004, pp. 3888-3893.

Chen, Y. et al., "Dispersion-Managed Mode Locking", Journal of the Optical Society of America B, Nov. 1999, pp. 1999-2004, vol. 16, No. 11, Optical Society of America.

Dasgupta, S. et al., "Design of Dispersion-Compensating Bragg Fiber with an Ultrahigh Figure of Merit," Optics Letters, Aug. 1, 2005, vol. 30, No. 15, Optical Society of America.

De Matos et al., Multi-kilowatt, Picosecond Pulses from an All-fiber Chirped Pulse Amplification System Using Air-core Photonic Bandgap Fiber, Lasers and Electro-optics, 2004, (CLEO), Conference on San Francisco, CA, USA, May 20-21, 2004, Piscataway, NJ, USA, IEEE, vol. May 17, 2004, pp. 973-974, XP010745448 ISBN: 978-1-55752-777-6.

De Matos, C. J. S. et al., "All-fiber Chirped Pulse Amplification using Highly-dispersive Air-core Photonic Bandgap Fiber," Nov. 3, 2003, Optics Express, pp. 2832-2837, vol. 11, No. 22.

Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.

Eggleton, et al., "Electrically Tunable Power Efficient Dispersion Compensating Fiber Bragg Grating," IEEE Photonics Technology Letters, vol., 11, No. 7, pp. 854-856, Jul. 1999.

Engeness et al., "Dispersion Tailoring and Compensation by Modal Interations in Omniguide Fibers," Optics Express, May 19, 2003, pp. 1175-1196, vol. 11, No. 10.

Fink et al., "Guiding Optical Light in Air Using an All-Dielectric Structure," Journal of Lightwave Technology, Nov. 1999, pp. 2039-2041, vol. 17, No. 11.

Folkenberg, J. R., et al., "Broadband Single-polarization Photonic Crystal Fiber," Optics Letters, vol. 30, No. 12, Jun. 15, 2005, pp. 1446-1448.

Folkenberg, J. R., et al., "Polarization Maintaining Large Mode Area Photonic Crystal Fiber," Optics Express vol. 12, No. 5, Mar. 8, 2004, pp. 956-960.

Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.

Hartl et al., "In-line high energy YB Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-7777-.

Hellstrom, E. et al., "Third-order Dispersion Compensation Using a Phase Modulator", Journal of Lightwave Technology, vol. 21, No. 5, pp. 1188-1197, May 2003.

Heritage, J. P. et al., "Picosecond Pulse Shaping by Spectral Phase and Amplitude Manipulation," Optics Letters, vol. 10, No. 12, pp. 609-611, Dec. 1985.

Heritage, J.P. et al., "Spectral Windowing of Frequency-Modulated Optical Pulses in a Grating Compressor," Applied Physics Letters, vol. 47, No. 2, pp. 87-89, Jul. 15, 1985.

Hill, K. et al., "Fiber Bragg Grating Technology Fundamentals and Overview," Journal of Lightwave Technology, Aug. 1997, vol. 15, No. 8, pp. 1263-1276.

Ibanescu et al., "Analysis of Mode Structure in Hollow Dielctric Waveguide Fibers, "Physical Review E 67, 2003, The American Physical Society.

Jiang, et al., "Fully Dispersion Compensated ~500 fs Pulse Transmission Over 50 km Single Mode Fiber," Optics Letters, vol. 30, No. 12, pp. 1449-1451, Jun. 15, 2005.

Jiang, et al., "Fully Dispersion Compensated ~500~fs Pulse Transmission Over 50 km Single Mode Fiber," Purdue University ECE Annual Research Summary, Jul. 1, 2004-Jun. 30, 2005.

Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.

Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Koechner, "Solid State Laser Engineering", Oct. 29, 1999, Section 5.5, pp. 270-277, 5th Edition, Springer.

Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.

Kyungbum, Kim et al., "1.4kW High Peak Power Generation from an all Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Levy et al., "Engineering Space-Variant Inhomogeneous Media for Polarization Control," Optics Letters, Aug. 1, 2004, pp. 1718-1720, vol. 29, No. 15, Optical Society of America.

Liao, K. et al.., "Large-aperture Chirped vol. Bragg Grating Based Fiber CPA System," Optics Express, Apr. 16, 2007, vol. 15, No. 8, pp. 4876-4882.

Lo, S. et al., "Semiconductor Hollow Optical Waveguides Formed by Omni-directional Reflectors", Optics Express, vol. 12, No. 26, Dec. 27, 2004, pp. 6589-6593.

Malinowski a. et al., "Short Pulse High Power Fiber Laser Systems," Proceedings of the 2005 Conference on Lasers and Electro-Optics (CLEO), Paper No. CThG3, pp. 1647-1649, May 26, 2005.

Mehier-Humbert, S. et al., "Physical Methods for Gene Transfer: Improving the Kinetics of Gene Delivery Into Cells," Advanced Drug Delivery Reviews, vol. 57, pp. 733-753, 2005.

Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.

Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.

Nicholson, J. et al., "Propagation of Femotsecond Pulses in Large-mode-area, Higher-order-mode Fiber," Optics Letters, vol. 31, No. 21, 2005, pp. 3191-3193.

Noda, J. et al., "Polarization-maintaining Fibers and Their Applications", Journal of Lightwave Technology, vol. Lt-4, No. 8 Aug. 1986, pp. 1071-1089.

Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.

Pelusi, M. D. et al., "Electrooptic Phase Modulation of Stretched 250-fs Pulses for Suppression of Third-Order Fiber Disperson in Transmission," IEEE Photonics Technology Letters, vol. 11, No. 11, pp. 1461-1463, Nov. 1999.

Pelusi, M. D. et al., "Phase Modulation of Stretched Optical Pulses for Suppression of Third-order Dispersion Effects in fibre Transmission," Electronics Letters, vol. 34, No. 17, pp. 1675-1677, Aug. 20, 1998.

Price et al., "Advances in High Power, Short Pulse, Fiber Laser Systems and Technology", Proceedings of SPIE—Volume 5709, Fiber Lasers II: Technology, Systems, and Applications, Apr. 2005, pp. 184-192.

Price et al., "Advances in High Power, Short Pulse, Fiber Laser Systems and Technology", Photonics West 2005, San Jose, California, Jan. 2005, pp. 5709-3720.

Ramachandran, S., et al., "High-power Amplification in a 2040-pm2 Higher Order Mode," SPIE Photonics West 2007, Post-deadline.

Resan et al., "Dispersion-Managed Semiconductor Mode-Locked Ring Laser", Optics Letters, Aug. 1, 2003, pp. 1371-1373, vol. 28, No. 15, Optical Society of America.

Schreiber, T., et al., "Design and High Power Operation of a Stress-induced single Polarization Single-transverse Mode LMA YB-doped Photonic Crystal Fiber," Fiber Lasers III: Technology, Systems, and Applications, Andrew J.W. Brown, Johan Nilsson, Donald J. Harter, Andreas Tunnermann, eds., Proc. of SPIE, vol. 6102, pp. 61020C-1-61020C-9, 2006.

Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.

Siegman, "Unstable Optical Resonators", Applied Optics, Feb. 1974, pp. 353-367, vol. 13, No. 2.

Limpert et al.,"All Fiber Chiped-Pulse Amplification System Based on Compression in Air-Guiding Photonic Bandgap Fiber", Optics Express, Dec. 1, 2003, vol. 11, No. 24, pp. 3332-3337.

* cited by examiner

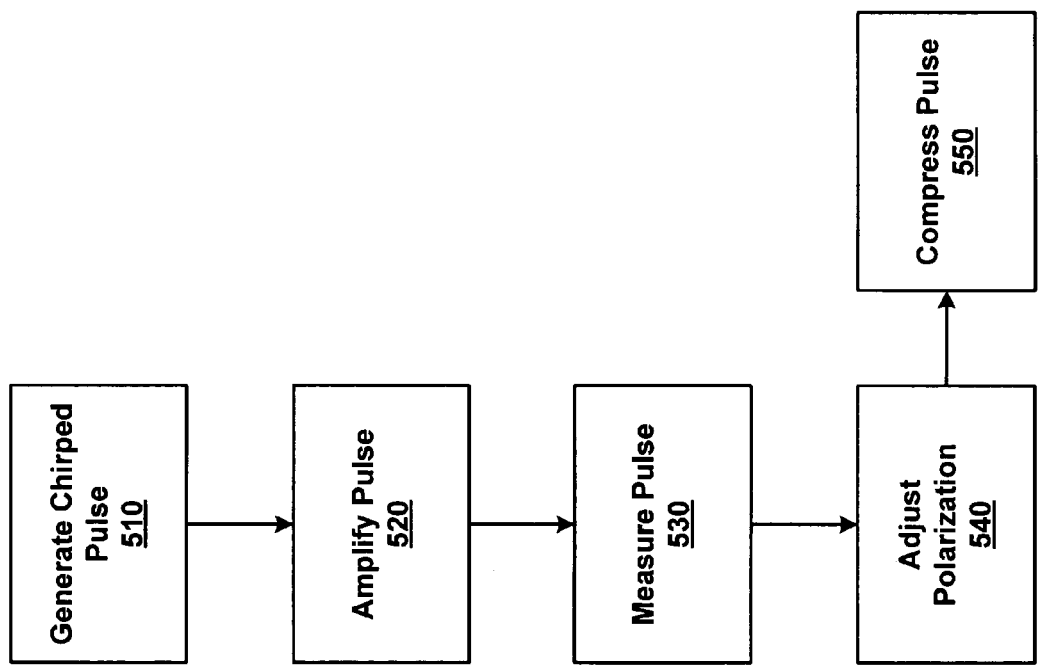

AUTOMATED POLARIZATION CORRECTION

CROSS-REFERENCE TO RELATED APPLICATIONS

This application claims benefit and priority from U.S. provisional patent application No. 60/700,429, filed Jul. 19, 2005 and entitled "Controlling Output Polarization of a High Power Amplifier." The disclosure of the above provisional patent application is hereby incorporated herein by reference.

BACKGROUND

1. Field of the Invention

The application is in the field of pulsed laser systems, and more specifically in the field of chirped pulse amplification systems.

2. Related Art

Chirped pulse amplification (CPA) is very useful for producing ultrashort-duration high-intensity pulses for use in high peak power ultrashort pulse laser systems. CPA increases the energy of an ultrashort laser pulse while avoiding optical amplifier damage. In this technique, the duration of the pulse is increased by first dispersing the ultrashort laser pulse temporally as a function of wavelength (a process called "chirping") to produce a chirped pulse, amplifying the chirped pulse, and then recompressing the chirped pulse to significantly shorten its duration. Lengthening the pulse in time reduces the peak power of the pulse and, thus, allows energy to be added to the pulse without reaching a damage threshold of the pulse amplifier and other optical components.

Some elements in a CPA system are polarization sensitive. For example, the performance of a pulse compressor that uses gratings to compress a laser pulse is highly polarization sensitive. Some elements in a CPA system alter polarizing in ways that are not precisely predictable. For example, passage of a pulse through a non polarization-maintaining (PM) fiber optic may alter the polarization of the pulse somewhat. This alteration can include a transformation of the polarization state into linear, circular or elliptical polarization.

The degree to which polarization is altered may be temperature or pulse power dependent, and may, therefore, be time dependent. This is a problem when subsequent elements within the CPA system are polarization sensitive, because their performance may be dependent on, for example, the temperature of polarization altering elements.

There is, therefore, a need for improved methods of managing polarization in CPA systems.

SUMMARY

The invention includes systems and methods of managing polarization in CPA systems. In some embodiments, these systems and methods include automatic polarization compensation after a pulse has passed through a polarization altering optic, and in some embodiments, they include automatic polarization compensation prior to a polarization altering optic. These two approaches are referred to herein as post-compensation and pre-compensation, respectively.

Both approaches to polarization compensation optionally include a method of automatically adjusting a polarization compensation element in response to a signal from a sensor. This adjustment may continue while the CPA system is operated and, thus, be responsive to changes in polarization resulting from time dependent characteristics, such as temperature or pulse power.

Various embodiments of the invention include a system comprising a source of chirped laser pulses, a pulse amplifier configured to amplify the chirped laser pulses to produce amplified laser pulses, a sensor configured to measure a characteristic of the amplified laser pulses, a variable polarization compensator configured to modify a polarization of the chirped laser pulses, a controller configured to receive an output of the sensor responsive to the characteristic and to control the polarization compensator responsive to the output, and a pulse compressor configured to temporally compress the amplified laser pulses.

Various embodiments of the invention include a method of adjusting a polarization of a laser pulse, the method comprising a) performing a first broad scan using a first birefringent optic to determine a first preferred position, b) selecting a second birefringent optic, c) performing a second broad scan using the second birefringent optic to determine a second preferred position, d) selecting the first birefringent optic, e) performing a narrow scan using the first birefringent optic to determine a third preferred position, f) selecting the second birefringent optic, g) performing a narrow scan using the second birefringent optic to determine a fourth preferred position, and h) directing the laser pulse though the first birefringent optic and the second birefringent optic to adjust the polarization of the laser pulse.

Various embodiments of the invention include a method comprising generating a chirped laser pulse, amplifying the chirped laser pulse, measuring a characteristic of the chirped laser pulse, compressing the chirped laser pulse, and adjusting a polarization of the chirped laser pulse prior to compressing the chirped laser pulse, responsive to the characteristic of the chirped laser pulse.

BRIEF DESCRIPTION OF THE DRAWINGS

FIG. 5 is a flowchart illustrating a method of generating a laser pulse, according to various embodiments of the invention.

DETAILED DESCRIPTION

In various embodiments of the invention, a polarization compensator is included in a CPA laser system. The polarization compensator is typically disposed relative to one or more polarization altering elements and a polarization sensitive element of the CPA system. The polarization altering element may be any element, such as an amplifier, that causes an undesirable change in polarization of a light pulse. This change of polarization state may be dependent on factors such as temperature or pulse power. Therefore, the extent of undesirable change in polarization may change over time. The polarization sensitive element is an element whose efficiency is dependent on a proper polarization of input light pulses. For example, the performance of a grating based compressor or isolator is dependent on the polarization of input light. If the input light does not properly match the polarization requirements of a grating compressor, light energy is lost and/or the compression is not as efficient as it could be. This will result in a degradation of the power and quality of output pulses.

In some embodiments, the polarization compensator is disposed between the polarization altering element and the polarization sensitive element. In these embodiments, the polarization compensator is configured to modify polarization so as to compensate for the effects of the polarization altering element after a laser pulse has passed through the polarization altering element. In some embodiments, the polarization compensator is disposed before both the polarization altering element and the polarization sensitive element. In these embodiments, the polarization compensator is configured to pre-compensate the polarization of a laser pulse such that after the laser pulse passes through the polarization altering element the laser pulse has a polarization appropriate for the polarization sensitive element.

The polarization compensator is configured to modify polarization responsive to a controller, which in turn is responsive to a sensor configured to measure one or more characteristics of a laser pulse. The sensor and controller provide a feedback mechanism configured to optimize operation of the polarization compensator and the output of the CPA laser system.

Figure 1:
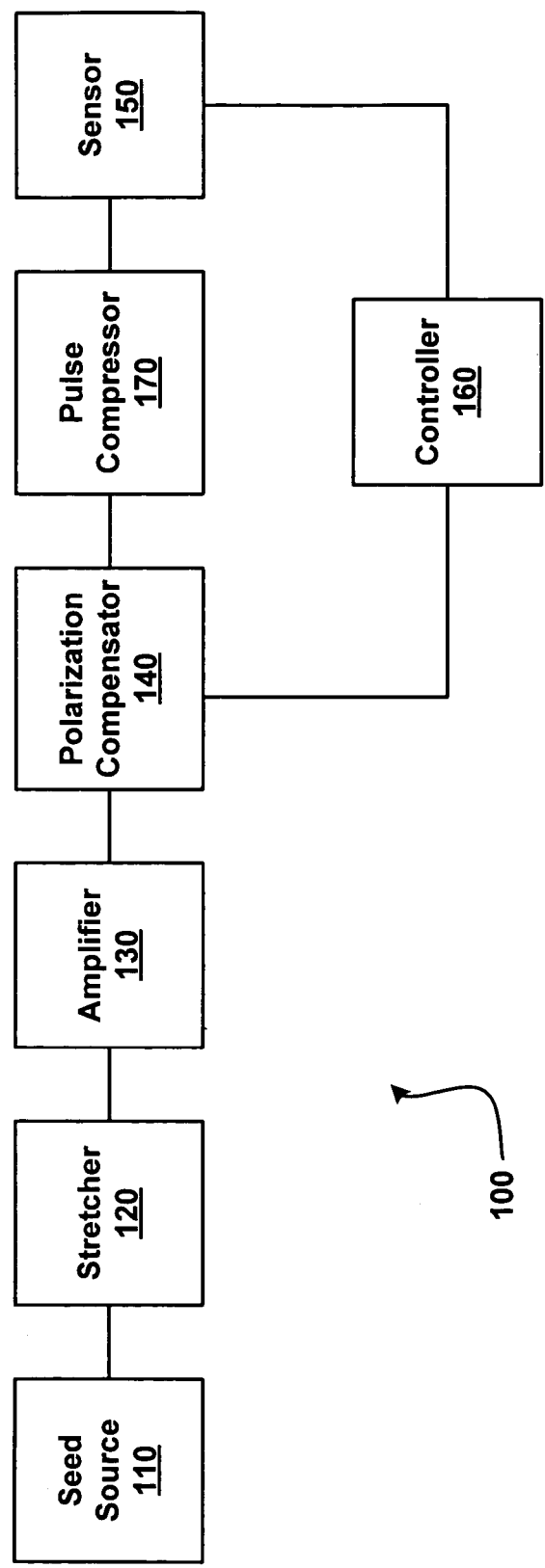
FIG. 1 is a block diagram illustrating a chirped pulse amplification system including post amplifier polarization correction, according to various embodiments of the invention.

FIG. 1 is a block diagram illustrating a Chirped Pulse Amplification System 100 including post amplifier polarization correction, according to various embodiments of the invention. Chirped Pulse Amplification System 100 includes a Seed Source 110 and an optional Stretcher 120. Together, Seed Source 110 and Stretcher 120 form a source of chirped laser pulses. In various embodiments, Seed Source 110 comprises, for example, a ring laser, a laser oscillator, a quasi-continuous wave laser, or the like. Stretcher 120 is configured to stretch a laser pulse in space and time to generate a chirped laser pulse. Stretcher 120 is optional in embodiments wherein Seed Source 110 produces chirped laser pulses directly. Various embodiments of Stretcher 120 include gratings, acousto-optic dispersive filters, tunable filters, a fiber Bragg grating, a Bragg fiber, or the like.

Chirped Pulse Amplification System 100 further includes an Amplifier 130 configured to amplify the chirped laser pulse. In various embodiments, Amplifier 130 includes a fiber-amplifier pumped by pump diodes, a semiconductor optical amplifier, a rod-type fiber, bulk solid state amplifier, or the like. For example, in some embodiments, Amplifier 130 includes a solid state optical amplifier, such as Nd:YAG or Yb:YAG. In some embodiments, Chirped Pulse Amplification System 100 comprises more than one amplifier. Amplifier 130 can be a polarization changing element in that it may alter the polarization state of a laser pulse during amplification. This change in polarization state may be dependent on power of the laser pulse, temperature of Amplifier 130, stress-induced or vibration-induced birefringence. For example, a change in polarization state may increase over time as the amplification process changes the temperature of Amplifier 130.

Chirped Pulse Amplification System 100 further includes a variable Polarization Compensator 140. Polarization compensator is configured to modify a laser pulse polarization. This modification is typically configured to compensate for any change in polarization state caused by Amplifier 130 and/or other elements within Chirped Pulse Amplification System 100. Polarization Compensator 140 can include, for example, a pair of birefringent wave plates, an electro-optic, a liquid crystal, a fiber-based polarization controller, or the like. Polarization Compensator 140 can be either active or passive, and is optionally configured to modify polarization to more than compensate for polarization changes caused by other elements. For example, Polarization Compensator 140 can be configured to compensate for a polarization change caused by another element and also rotate polarization by 90 degrees.

The polarization modification performed by Polarization Compensator 140 is variable. In some embodiments, the modification is varied by changing a position of part of Polarization Compensator 140. For example, a birefringent wave plate may be rotated in order to vary polarization. This rotation may be accomplished using a stepper motor. In some embodiments, the modification is varied by applying an electric or magnetic field to part of Polarization Compensator 140. For example, an electric field may be applied to an electro-optic to vary polarization.

The polarization modification performed by Polarization Compensator 140 is responsive to a Controller 160. Controller 160 is a logic device configured to receive a signal from a Sensor 150, to process the signal from Sensor 150, and to send control signals to Polarization Compensator 140 in response to the processed signal. In some embodiments, Controller 160 is further configured to scan Polarization Compensator 140 so as to identify a preferred state of Polarization Compensator 140. This preferred state may include a preferred position, a preferred electric field, and/or a preferred magnetic field. The preferred state is typically a state that results in a desired characteristic of the output of Chirped Pulse Amplification System 100. Controller 160 includes a microprocessor, electronic circuit, software, firmware, hardware, or the like.

Sensor 150 is configured to determine one or more characteristics of a laser pulse. These characteristics can include, for example, polarization, power, pulse width, beam width, dispersion, mode, or the like. For example, in one embodiment, Sensor 150 includes a power sensor configured to measure a power of a laser pulse and to provide a signal to Controller 160 representative of the measured power.

Typically, Sensor 150 and Polarization Compensator 140 are separated by one, two or more polarization sensitive elements of Chirped Pulse Amplification System 100. For example, in the embodiments illustrated by FIG. 1, Polarization Compensator 140 and Sensor 150 are separated by a Pulse Compressor 170. Pulse Compressor 170 may include, for example a grating pair, a Treacy compressor, a fiber Bragg grating, a Bragg fiber, a volume Bragg grating or the like. Sensor 150 is disposed to provide feedback to Polarization Compensator 140 responsive to the output of the polarization sensitive element. In some embodiments, this feedback is used to adjust Polarization Compensator 140 so as to optimize the output of the polarization sensitive element. Other polarization sensitive elements that may be disposed between Polarization Compensator 140 and Sensor 150 include polarizers, mirrors, faraday rotators, diffractive optical elements, or the like. Polarization Compensator 140 is optionally integrated with Amplifier 130. For example, both Polarization compensator 140 and Amplifier 130 may include optical fibers directly coupled to each other.

Figure 2:
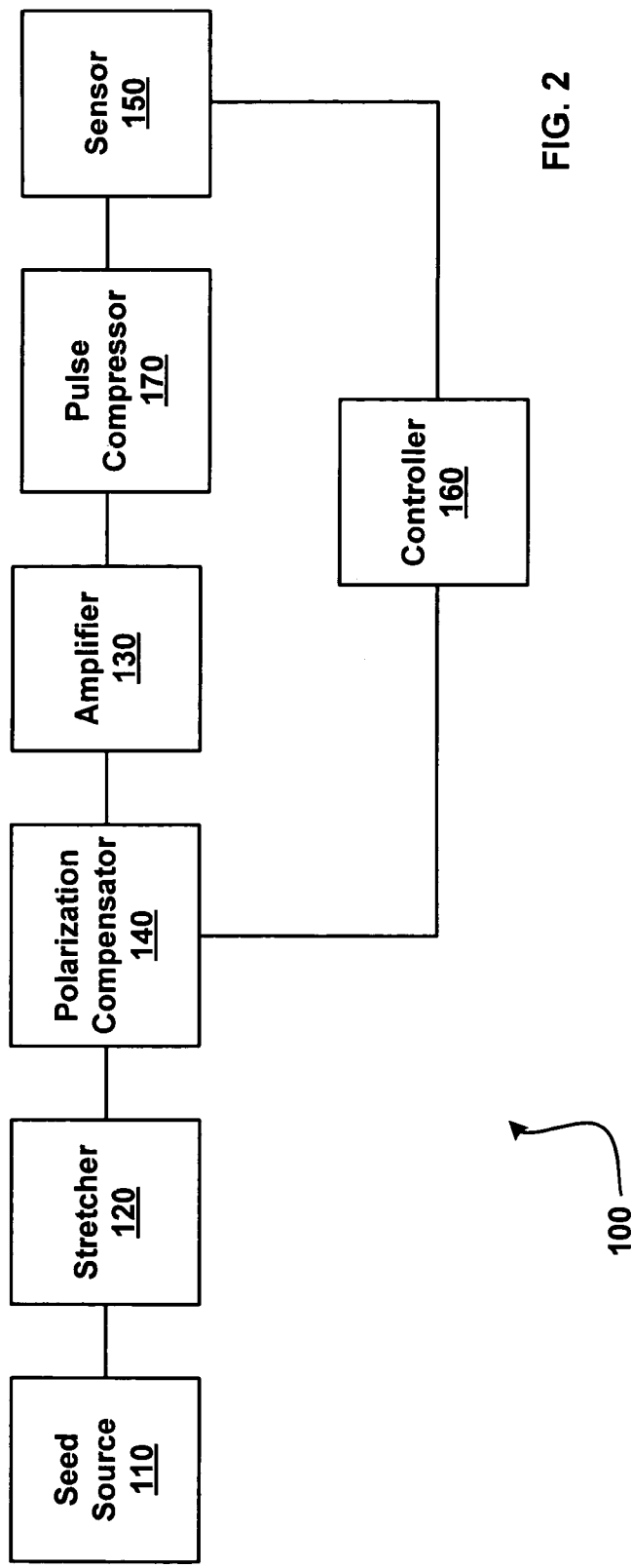
FIG. 2 is a block diagram illustrating a chirped pulse amplification system including pre-amplifier polarization correction, according to various embodiments of the invention.

FIG. 2 is a block diagram illustrating alternative embodiments of Chirped Pulse Amplification System 100 including pre-amplifier polarization correction. In these embodiments, Polarization Compensator 140 is disposed before Amplifier 130 and is configured to pre-compensate a laser pulse such that the pulse has a preferred polarization after passing through Amplifier 130. If Polarization Compensator 140 is disposed prior to Amplifier 130 then Polarization Compensator 140 need not be configured to handle the energies of amplified pulses.

Figure 3:
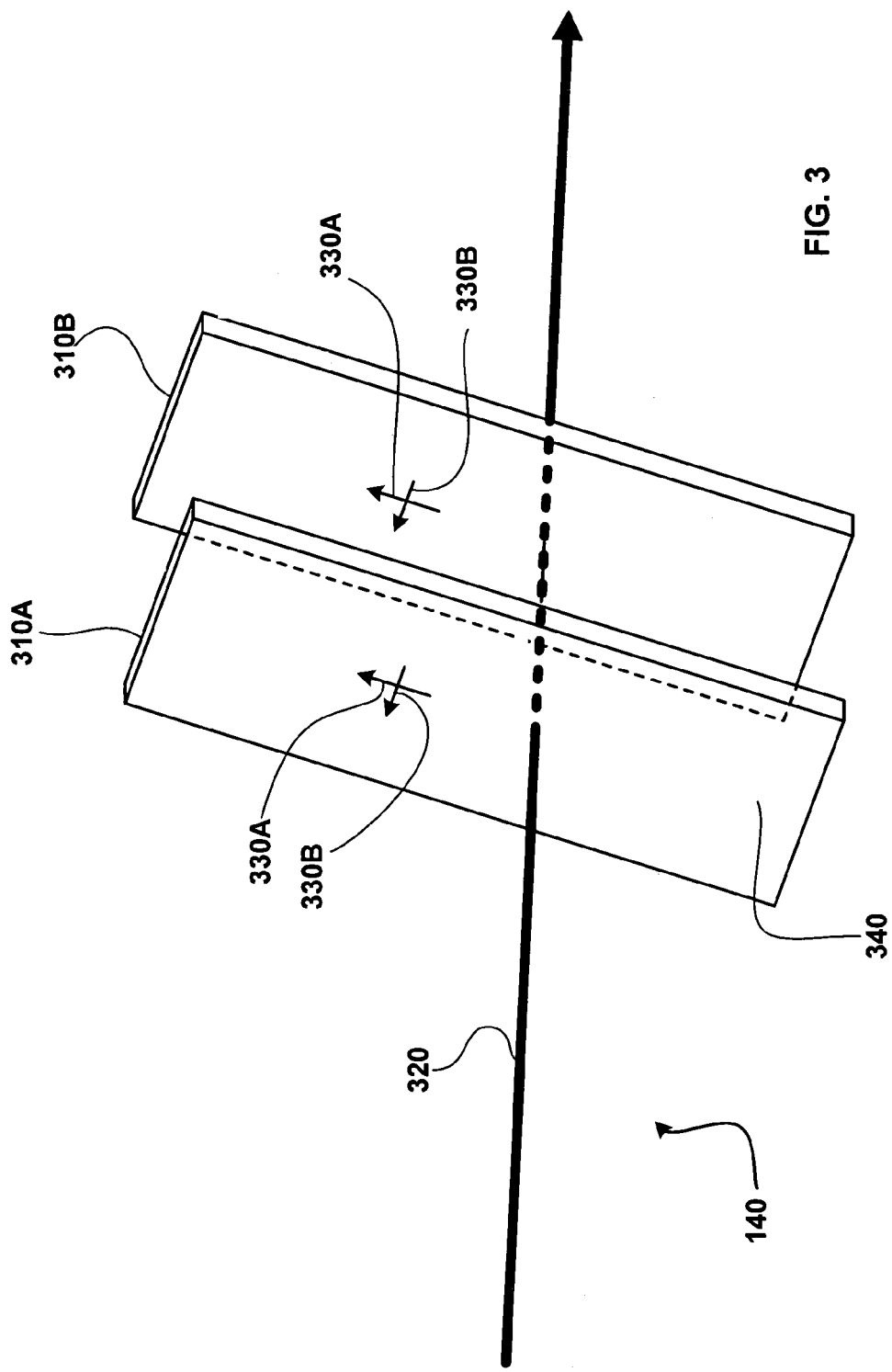
FIG. 3 is an illustration of a polarization compensator, according to various embodiments of the invention.

FIG. 3 is an illustration of Polarization Compensator 140, according to various embodiments of the invention. In these particular embodiments, Polarization Compensator 140 includes a pair of birefringent Wave Plates 310A and 310B disposed within a Path 320 of a laser pulse. Typically, one of Wave Plates 310A is a quarter-wave plate, while the other is a half-wave plate. Wave Plates 310A and 310 B are birefringent in that they have an angle dependent index of refraction. Thus, the index of refraction in a First Axis 330A is different from the index of refraction in a Second Axis 330B. Modification of the polarization of a laser pulse is dependent on the relative angles between the polarization of the laser pulse, First Axis 330A and Second Axis 330B. To vary the modification of the polarization of the laser pulse, Wave Plates 310A and 310B are each independently rotated in the plane defined by First Axis 330A and Second Axis 330B. While Wave Plates 310A and 310B are illustrated in FIG. 3 include a rectangular shape, alternative embodiments include square, circular or other shapes.

Wave Plates 310A and 310B are typically rotated using a stepper motor, a piezoelectric, an electric, magnetic or pneumatic actuator, or the like. For example, in some embodiments each of Wave Plates 310A and 310B are rotated using a stepper motor (not shown). Because each of Wave Plates 310A and 310B are optionally configured to be rotated a full 360 degrees, the stepper motor does not necessarily need a positioning encoder.

Wave Plates 310A and 310B are optionally disposed such that Path 320 strikes each at an angle slightly off normal to a Front Surface 340.

Figure 4:
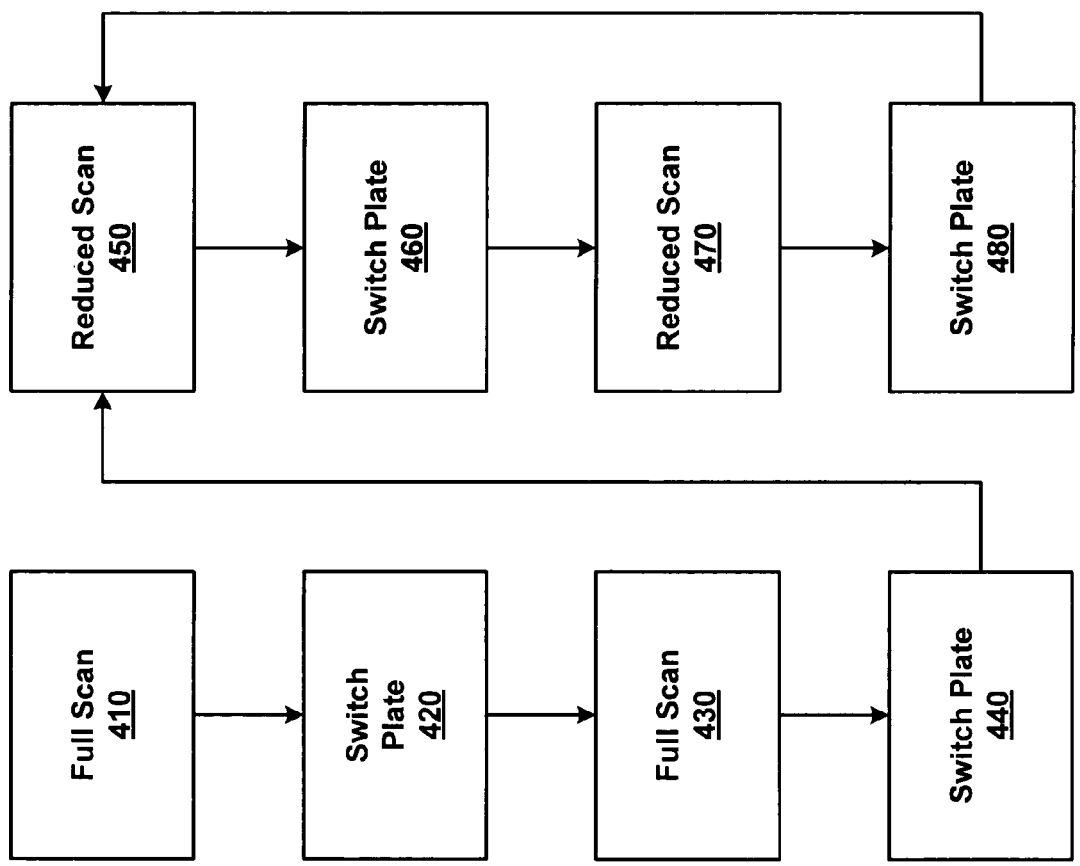
FIG. 4 is a flowchart illustrating a method of identifying preferred characteristics of a polarization compensator, according to various embodiments of the invention.

FIG. 4 is a flowchart illustrating a method of identifying preferred characteristics of Wave Plates 310A and 310B, according to various embodiments of the invention. This method includes an iterative process in which each of Wave Plates 310A and 310B are independently moved to identify a series of progressively better positions. In a Full Scan Step 410, Wave Plate 310A is rotated to identify a preferred position. This rotation may be as much as 180 or 360 degrees. During the rotation the output signal of Sensor 150 is monitored and a maximum (or minimum) in a pulse characteristic (e.g., power or polarization) is identified. The number of degrees by which Wave Plate 310A is rotated is typically sufficient to identify the maximum. In some embodiments, this includes a rotation of at least 45 degrees. The position of Wave Plate 310A at which this maximum (or minimum) occurs is considered a preferred position for Wave Plate 310A. This position is dependent on the position of Wave Plate 310B during Full Scan Step 410. In most embodiments, only one of Wave Plates 310A and 310B is moved at the same time. Typically, Full Scan Step 410 results in a significant variation in the output of Chirped Pulse Amplification System 100.

In a Switch Plate Step 420, the Wave Plate 310B is selected for movement. Because, only one of Wave Plate 310A and 310B are typically moved at the same time, Switch Plate Step 420 optionally includes switching a single stepper motor driver from a stepper motor associated with Wave Plate 310A to a stepper motor associated with Wave Plate 310B.

In a Full Scan Step 430, Wave Plate 310B is rotated to identify a preferred position of Wave Plate 310B. This rotation may be as much as 180 or 360 degrees, and in some embodiments, at least 45 degrees. As in Full Scan Step 410, the output signal of Sensor 150 is monitored and a maximum (or minimum) in a pulse characteristic is identified. This maximum (or minimum) is considered a preferred position for Wave Plate 310B.

In a Switch Plate Step 440, Wave Plate 310A is selected for movement.

In a Reduced Scan Step 450, Wave Plate 310A is again rotated in order to find a new preferred position. Reduced Scan Step 450 typically includes less rotation of Wave Plate 310A than Full Scan Step 410. For example, in various embodiments, Reduced Scan Step 450 includes rotations of less than 45, 30, 20 10 and 5 degrees. Because of the movement of Wave Plate 310B that took place in Full Scan Step 430, the preferred position of Wave Plate 310A that was found in Full Scan Step 410 is normally different from the new preferred position of Wave Plate 310A that is found in Reduced Scan Step 450.

In a Switch Plate Step 460, Wave Plate 310B is selected for movement.

In a Reduced Scan 470, Wave Plate 310B is again rotated in order to find a new preferred position. Reduced Scan Step 470 typically includes less rotation of Wave Plate 310B than Full Scan Step 430. For example, in various embodiments, Reduced Scan Step 450 includes rotations of less than 45, 30, 20 10 and 5 degrees.

In a Switch Plate Step 480, Wave Plate 310A is selected for movement. Steps 450-480 are then optionally repeated. In various embodiments, Steps 450-480 are repeated on a periodic basis, e.g., at least every 5 seconds, 15 seconds, 30 seconds, 60 seconds, 2 minutes, 5 minutes or 10 minutes. In some embodiments, steps 450-480 are repeated until a desired pulse power is achieved. The rotation in Reduced Scan Steps 450 and 470 typically result in less of an impact in the output of Chirped Pulse Amplification System 100 than the rotation in Full Scan Steps 410 and 430. As such, Steps 450-480 are optionally performed while the output of Chirped Pulse Amplification System 100 is being applied to an end use.

FIG. 5 is a flowchart illustrating a method of generating a laser pulse, according to various embodiments of the invention. This method includes generating one or more laser pulses, passing the one or more laser pulses through an element that causes a change in polarization state of the laser pulses, measuring the one or more laser pulses to identify a preferred modification of the polarization state, and modifying the polarization state to compensate for the change in polarization state. While the method illustrated by FIG. 5 is discussed in terms of a single pulse, the method is typically applied to a series of pulses such that steps performed in response to a first pulse effect subsequent pulses.

In a Generate Chirped Pulse Step 510, at least one chirped laser pulse is generated. This pulse may be generated using Seed Source 110 and Stretcher 120, or using an alternative source of chirped laser pulses.

In an Amplify Pulse Step 520, the chirped pulse generated in Generate Chirped Pulse Step 510 is amplified using Amplifier 130. This amplification process may result in a change in the state of polarization of the laser pulse.

In a Measure Pulse Step 530, the amplified pulse is measured using Sensor 150. This measurement may include a power measurement, a polarization measurement, a pulse width measurement, a mode measurement, and/or the like.

In an Adjust Polarization Step 540, Polarization Compensator 140 is adjusted, for example using Steps 450-480 of FIG. 4, responsive to the measurement made in Measure Pulse Step 530. This adjustment results in a change in the polarization of subsequent pulses.

In a Compress Step 550, the chirped pulse is compressed using Pulse Compressor 170.

The order of the steps illustrated in FIG. 5 can vary significantly in different embodiments of the invention. For example, Measure Pulse Step 530 may occur before or after Compress Pulse Step 550. Adjust Polarization Step 540 may occur before or after Amplify Pulse Step 520. Typically, Measure Pulse Step 530 is applied to a first pulse and the effect of Adjust Polarization Step 540 is experienced by a second subsequent pulse.

Several embodiments are specifically illustrated and/or described herein. However, it will be appreciated that modifications and variations are covered by the above teachings and within the scope of the appended claims without departing from the spirit and intended scope thereof. For example, Chirped Pulse Amplification System 100 may include a plurality of Polarization Compensator 140 and/or a plurality of Sensor 150. Chirped Pulse Amplification System 100 may include a delivery fiber and Sensor 150 may be configured to measure a characteristic of a pulse after the pulse passes through the delivery or compressor fiber.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
a source of chirped laser pulses;
a variable polarization compensator configured to modify a polarization of the chirped laser pulses;
a single-pass pulse amplifier configured to alter polarization of the entire chirped laser pulses without optical feedback and to amplify the chirped laser pulses modified by the variable polarization compensator to produce amplified laser pulses, the variable polarization compensator modification configured to compensate for a change in polarization state caused by the pulse amplifier;
a polarization sensor configured to measure the polarization state of the amplified laser pulses;
a controller configured to receive an output of the polarization sensor responsive to the measured polarization and to control the variable polarization compensator responsive to the output; and
a pulse compressor configured to temporally compress the amplified laser pulses.

2. The system of claim 1, wherein the variable polarization compensator is disposed to pre-compensate the chirped laser pulses before the chirped laser pulses are amplified by the pulse amplifier.

3. The system of claim 1, wherein the variable polarization compensator is disposed to modify the polarization of the chirped laser pulses after the chirped laser pulses are amplified by the pulse amplifier and before the chirped laser pulses are compressed using the pulse compressor.

4. The system of claim 1, wherein the variable polarization compensator is disposed to modify the polarization of the chirped laser pulses after the chirped laser pulses are amplified by the pulse amplifier and after the chirped laser pulses are compressed using the pulse compressor.

5. The system of claim 1, wherein the source of chirped laser pulses includes a pulse stretcher.

6. The system of claim 1, wherein the pulse amplifier includes a fiber amplifier.

7. The system of claim 1, wherein the pulse compressor includes a Bragg fiber.

8. The system of claim 1, wherein the variable polarization compensator includes a birefringent optic.

9. The system of claim 1, wherein the variable polarization compensator includes two birefringent plates.

10. The system of claim 1, wherein the variable polarization compensator includes two birefringent plates configured to be moved using a single controller.

11. The system of claim 1, wherein the variable polarization compensator includes an electro-optic or a liquid crystal.

12. The system of claim 1, wherein the controller is configured to adjust the variable polarization compensator on a periodic basis at least every 5 minutes.

13. A method comprising:
generating a chirped laser pulse;
amplifying the chirped laser pulse with a single-pass amplifier that excludes optical feedback;
measuring the polarization of the chirped laser pulse;
compressing the chirped laser pulse; and
adjusting a polarization of the entire chirped laser pulse prior to compressing the chirped laser pulse, responsive to the polarization characteristic of the chirped laser pulse.

14. The method of claim 13, wherein generating the chirped laser pulse includes stretching a seed pulse.

15. The method of claim 13, wherein the step of amplifying the chirped laser pulse includes using a fiber amplifier.

16. The method of claim 13, wherein the step of amplifying the chirped laser pulse includes using a rod-type fiber.

17. The method of claim 13, wherein the step of amplifying the chirped laser pulse includes using a bulk solid state amplifier.

18. The method of claim 13, wherein the step of compressing the chirped laser pulse is performed using a polarization sensitive device.

19. The method of claim 13, wherein the step of measuring a characteristic of the chirped laser pulse is performed before the step of compressing the chirped pulse.

20. The method of claim 13, wherein the step of measuring a characteristic of the chirped laser pulse is performed after the step of compressing the chirped pulse.

21. The method of claim 13, wherein the step of amplifying the chirped laser pulse is performed after the step of adjusting the polarization.

22. The method of claim 13, wherein the step of adjusting the polarization is performed after the step of amplifying the chirped laser pulse.

* * * * *